(12) United States Patent
Gunn et al.

(10) Patent No.: US 8,262,320 B2
(45) Date of Patent: Sep. 11, 2012

(54) BALLAST-FILLED PIPELINE WEIGHT

(76) Inventors: Donald O. Gunn, Sherwood Park (CA); Lyle Connley Reid, Sherwood Park (CA)

( * ) Notice: Subject to any disclaimer, the term of this patent is extended or adjusted under 35 U.S.C. 154(b) by 207 days.

(21) Appl. No.: 12/626,660

(22) Filed: Nov. 26, 2009

(65) Prior Publication Data
US 2010/0189514 A1    Jul. 29, 2010

Related U.S. Application Data

(60) Provisional application No. 61/148,299, filed on Jan. 29, 2009.

(51) Int. Cl.
*F16L 1/06* (2006.01)
*B65D 33/14* (2006.01)
(52) U.S. Cl. .................... 405/184.4; 383/24
(58) Field of Classification Search ............... 405/184.4; 383/105, 903, 33, 24
See application file for complete search history.

(56) References Cited

U.S. PATENT DOCUMENTS

| | | | |
|---|---|---|---|
| 687,389 A | 11/1901 | Wilhelmi | |
| 2,696,235 A | 12/1954 | Toffolon | |
| 3,374,635 A | 3/1968 | Crandall | |
| 3,779,027 A | 12/1973 | Murphy | |
| 3,793,845 A | 2/1974 | Keith | |
| 3,861,158 A | 1/1975 | Swain et al. | |
| 4,300,608 A * | 11/1981 | Cuthbertson | 383/7 |
| 4,390,051 A | 6/1983 | Cuthbertson | |
| 4,477,206 A | 10/1984 | Papetti et al. | |
| 4,688,979 A | 8/1987 | Kupersmit | |
| 4,865,096 A | 9/1989 | Schober et al. | |
| 5,160,218 A | 11/1992 | Hill | |
| 5,188,460 A | 2/1993 | Dorse | |
| 5,385,430 A | 1/1995 | Connors | |
| 5,443,329 A | 8/1995 | de Geeter | |
| 5,664,887 A * | 9/1997 | LaFleur | 383/119 |
| 6,220,788 B1 | 4/2001 | Jewell | |
| 6,402,378 B1 * | 6/2002 | Shackleton | 383/119 |
| 2006/0198705 A1 * | 9/2006 | Willis et al. | 405/184.4 |

FOREIGN PATENT DOCUMENTS

| | | |
|---|---|---|
| CA | 2075006 | 1/1993 |
| GB | 1585170 | 2/1981 |
| GB | 2063212 | 6/1981 |

* cited by examiner

*Primary Examiner* — Kenneth L Thompson
*Assistant Examiner* — Kyle Armstrong
(74) *Attorney, Agent, or Firm* — Donald V. Tomkins

(57) ABSTRACT

A flexible bag-type pipeline weight, configured to straddle a pipeline, has internal tie means to prevent excessive bulging of the weight after being filled with ballasting material, thus facilitating installation in narrow trenches. Built-in loading loops facilitate filling the weight with ballasting material without need for special loading equipment. The bag-type pipeline weight is formed with a pair of leg sections on either side of a central, pipeline-receiving recess. Once filled with ballast, the legs remain separated, thus facilitating installation on a pipeline. The filled pipeline weight is also freestanding and stable for purposes of transport and storage prior to installation. Hoisting slings facilitate lifting and manipulation of loaded pipeline weights without the need for spreader bars.

8 Claims, 4 Drawing Sheets

US 8,262,320 B2

BALLAST-FILLED PIPELINE WEIGHT

CROSS-REFERENCE TO RELATED APPLICATIONS

This application claims the benefit, pursuant to 35 U.S.C. 119(c), of Provisional Application No. 61/148,299, filed on Jan. 29, 2009, and said provisional application is incorporated herein by reference in its entirety for continuity of disclosure.

FIELD OF THE INVENTION

The present invention relates in general to means for anchoring or preventing flotation of pipelines, such as oil and gas pipelines. In particular, the invention relates to bag-type weights for large diameter pipelines.

BACKGROUND OF THE INVENTION

Weights of various types are commonly used to anchor pipelines, particularly for pipelines running through water bodies, marshes, sloughs, or other moisture-laden zones in which pipelines might be upwardly displaced due to buoyancy forces. Bag-type pipeline weights are typically made from a flexible and durable fabric or similar material, with pockets or compartments that can be filled with ballast material (such as gravel) to provide weight as needed. The filled weights are then laid over or attached to a pipeline at spaced intervals. Some known bag-type weights incorporate or require straps of sonic sort, to be wrapped and tied around the pipeline. Other designs simply rely on the ballast mass to keep the weights in place relative to the pipeline. Some known designs are configured to straddle the pipeline, with ballast-filled side lobes extending down each side of the pipeline. Bag-type weights have a particular advantage over other known pipeline weights in that they can be filled with ballast material at or near to a pipeline-laying operation, resulting in considerably lower weight transportation costs as compared to, for instance, precast concrete weights.

Examples of prior art bag-type pipeline weights may be found in the following patent documents:
  U.S. Pat. No. 3,793,845 (Keith);
  CA 2,075,006 and U.S. Pat. No. 5,385,430 (Connors); and
  CA 2,277,523 and U.S. Pat. No. 6,220,788 (Jewell).

The problem of providing ballast for larger diameter pipelines (e.g., 16-inch plus) has particular challenges. The volume of a pipe per unit of pipe length (i.e., the cross-sectional area of the pipe) is proportionate to the square of the diameter. Accordingly, the potential buoyancy forces acting on a pipeline, per unit of pipeline length, also vary with the square of the pipeline diameter, and the ballast weight (or anchoring force) required to counteract the potential buoyancy forces is generally proportional to the square of the pipeline diameter as well. For example, the ballast weight required to weigh down a given length of 32-inch diameter pipeline will be about four times greater than for the same length of 16-inch diameter pipe (in similar service conditions).

Because of their inherent configurations, prior art bag-type weights are not suitable or readily adaptable for ballasting large-diameter pipe. For example, weights such as those taught by Jewell are not readily scalable to accommodate the much greater mass of ballast required for large-diameter pipelines. The Connors design, if scaled up to hold greatly increased amounts of ballast, will be difficult to fill, handle, and install, particularly where it is desired or necessary to install a pipeline in a trench with minimum possible side clearances.

For the foregoing reasons, there is a need for a bag-type pipeline weight design that is readily adaptable to accommodate the large volumes of gravel or other ballast material required to weigh down large-diameter pipelines. At the same time, there is a need for a bag-type pipeline weight for large-diameter pipelines that is easier to fill, transport, and install than known bag-type weight designs. Furthermore, there is a need for a bag-type pipeline weight for large-diameter pipelines that substantially retains its shape after being filled with ballast and during installation, thus facilitating its use in comparatively narrow pipeline trenches. The present invention is directed to these needs.

BRIEF DESCRIPTION OF THE INVENTION

The present invention provides a flexible bag-type pipeline weight configured to straddle a pipeline, with internal tic means for preventing excessive bulging of the weight during or after being filled with ballasting material, thus facilitating installation in comparatively narrow pipeline trenches. Built-in loading loops facilitate filling the weight with gravel or other ballasting material, without need for special loading hoppers or other complex equipment. The pipeline weight of the present invention is formed with a pair of leg sections on either side of a central, pipeline-receiving recess. Once filled with ballast, the legs remain separated, thus facilitating installation on a pipeline. The filled pipeline weight is also free-standing and stable for purposes of transport and storage prior to installation. Hoisting slings may be used to facilitate lifting and manipulation of loaded pipeline weights without the need for spreader bars.

BRIEF DESCRIPTION OF THE DRAWINGS

Embodiments of the invention will now be described with reference to the accompanying figures, in which numerical references denote like parts, and in which.

DETAILED DESCRIPTION OF THE PREFERRED EMBODIMENT

Figure 1:
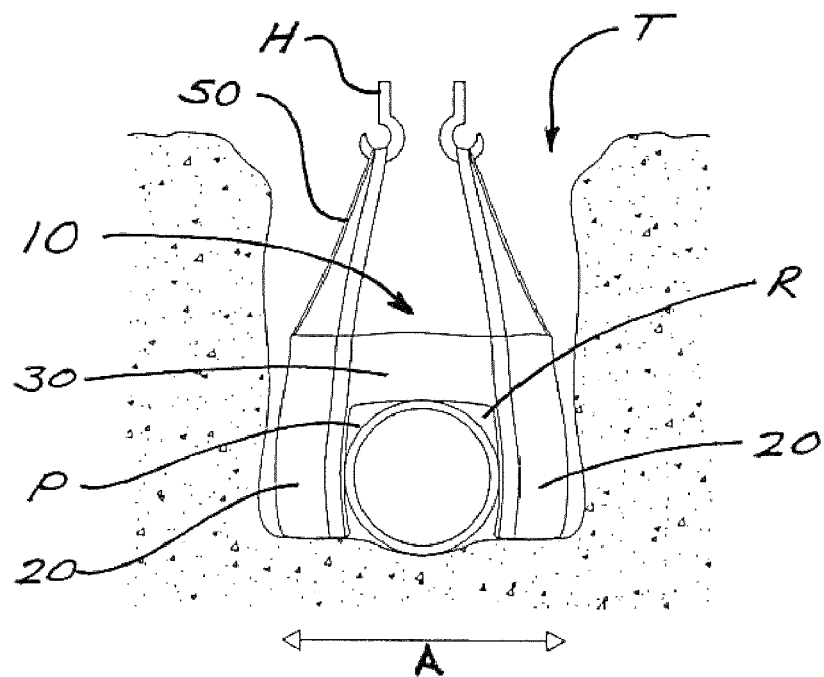
FIG. 1 is a cross-section through a pipeline trench, showing a bag-type weight generally in accordance the present invention being installed over a pipeline in the trench.
Figure 2:
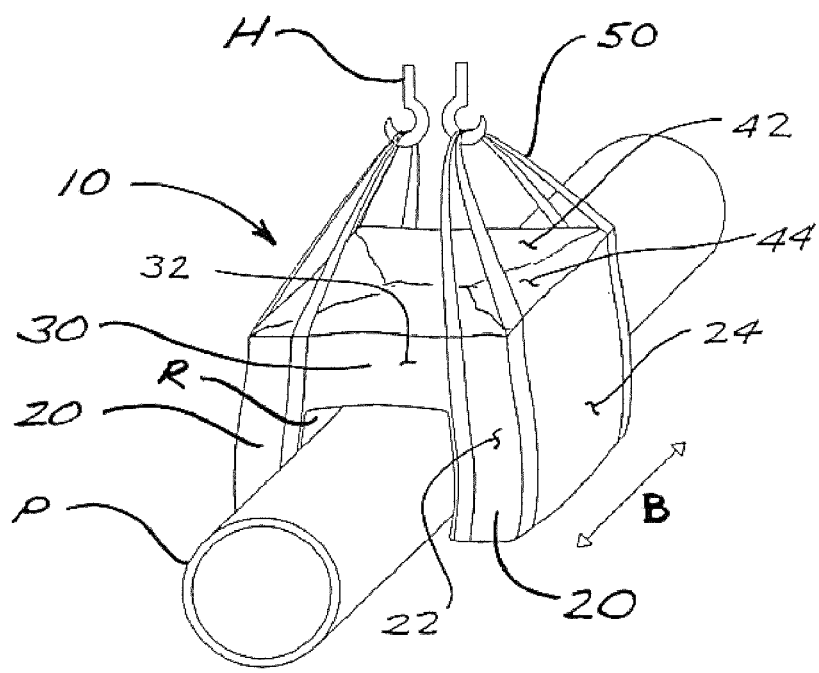
FIG. 2 is a perspective view of a bag-type weight in accordance with one embodiment of the invention being positioned over a pipeline.

FIGS. 1 and 2 illustrate a pipeline weight 10 in accordance with one embodiment of the present invention, being positioned over a pipeline P in a trench T. Pipeline weight 10 has a nominal overall width A and a nominal length B (parallel to pipeline P). Weight 10 preferably has a plurality of hoisting slings 50 which in FIGS. 1 and 2 are shown being supported by hoisting means conceptually indicated by lifting hooks H. Weight 10 is fashioned from a suitable flexible fabric or similar material, which in preferred embodiments will be a geotextile.

Tables 1 and 2 provide data relating to weights and preferred materials for non-limiting examples of embodiments of weight 10 for selected combinations of pipe size, weight width A, and weight length B.

TABLE 1

| Bag Dimensions on Pipe | | | Weights | |
|---|---|---|---|---|
| Pipe Size | A | B | lb | kg |
| 16" | 36" | 84" | 2,500 | 1,134 |
| 20" | 45" | 96" | 5,000 | 2,268 |
| 24" | 54" | 96" | 5,000 | 2,268 |
| 30" | 67" | 96" | 7,000 | 3,175 |
| 36" | 81" | 96" | 9,000 | 4,080 |
| 42" | 94" | 96" | 12,500 | 5,440 |
| 48" | 108" | 96" | 12,500 | 5,440 |

TABLE 2

| Bag Material Data | | | |
|---|---|---|---|
| | Geotextile | Loading Slings | |
| Pipe Size | Material Weight | Width | Load Rating |
| 16" | 200 g/m² × 2 Layers | 4" | 4 × 6000 lbs |
| 20" | 200 g/m² × 2 Layers | 4" | 4 × 6000 lbs |
| 24" | 200 g/m² × 2 Layers | 4" | 4 × 6000 lbs |
| 30" | 200 g/m² × 2 Layers | 4" | 4 × 6000 lbs |
| 36" | 200 g/m² × 2 Layers | 4" | 4 × 6000 lbs |
| 42" | 200 g/m² × 2 Layers | 4" | 6 × 6000 lbs |
| 48" | 200 g/m² × 2 Layers | 4" | 6 × 6000 lbs |

Figure 3:
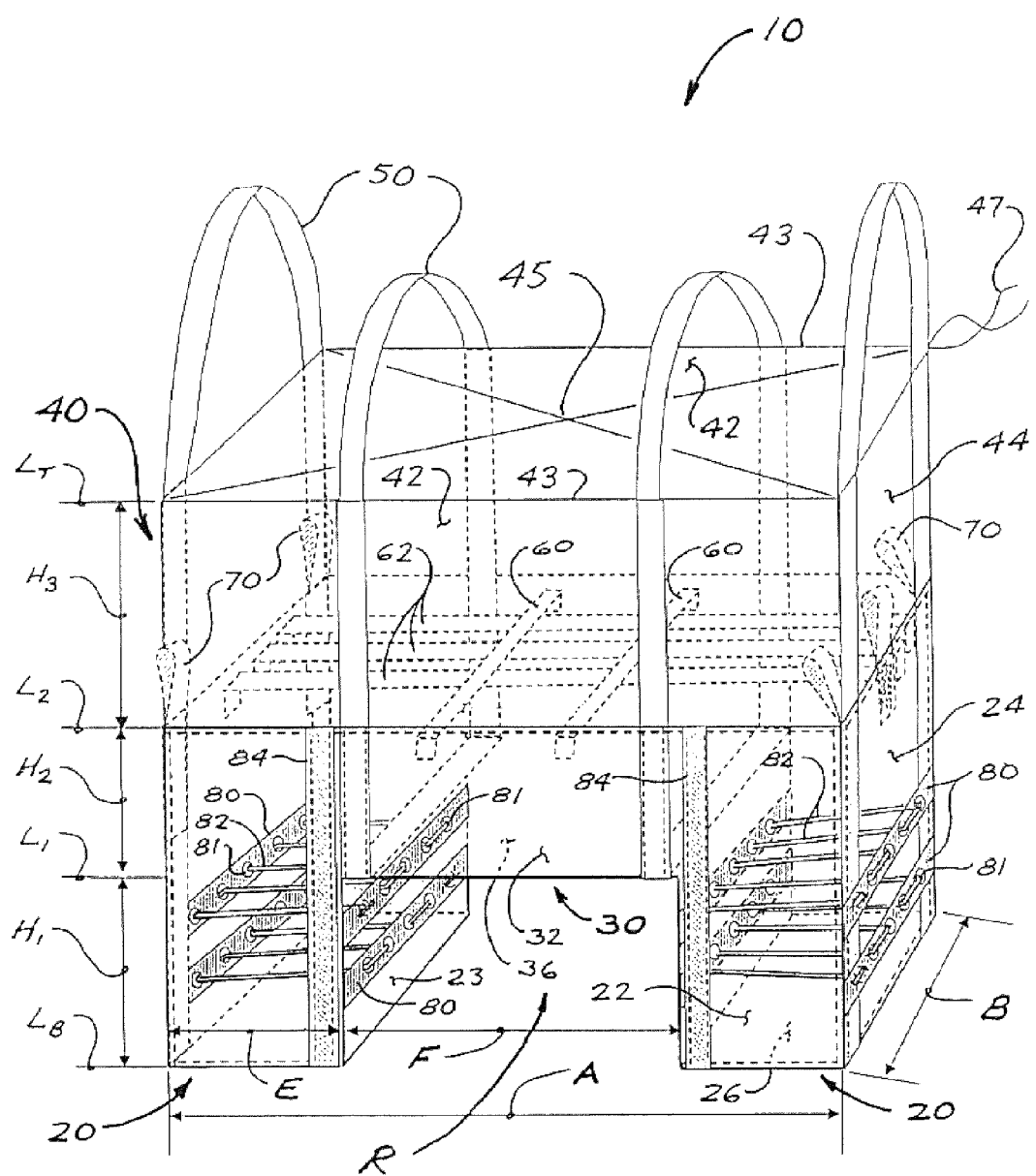
FIG. 3 is a perspective view of a first embodiment of the invention.

FIG. 3 illustrates in detail the construction of one particular embodiment of a pipeline weight 10 in accordance with the present invention. In general configuration, pipeline weight 10 resembles an open-topped bag with an arch-like recess R formed in a bottom region to allow weight 10 to straddle a pipeline P, with pipeline P disposed within recess R (as shown in FIGS. 1 and 2). In the embodiment shown in FIG. 3, weight 10 has an overall width A and can be considered as divided into four rectilinear sections, as follows:

- a pair of leg sections 20, each having a width E and a length B, and extending in height from a floor panel 26, at a bottom level $L_B$, to an upper intermediate level $L_2$;
- a central section 30 extending between leg sections 20 and having a width F and a length B, and extending a height $H_2$ from a floor panel 36, at a lower intermediate level $L_1$, to upper intermediate level $L_2$; and
- a top section 40 having a width A and a length B, and extending a height $H_3$ from upper intermediate level $L_2$ to a perimeter top edge 43 at a top level $L_T$.

Each leg section 20 has an inner sidewall 23 of length B, extending a height $H_1$ from bottom level $L_B$ to lower intermediate level $L_1$ (i.e., between floor panels 26 and 36): an outer sidewall 24 of length B, extending from bottom level $L_B$ to upper intermediate level $L_2$ (i.e., a total height of $H_1$ plus $H_2$); and a pair of opposing endwalls 22 of width E, extending from bottom level $L_B$ to upper intermediate level $L_2$ (i.e., a total height of $H_1$ plus $H_2$). Central section 30 has a pair of opposing endwalls 32 of width F and height $H_2$, which are contiguous with corresponding endwalls 22 and which extend a height $H_2$ from lower intermediate level $L_1$ (i.e., from floor panel 36) to upper intermediate level $L_2$.

Top section 40 has a pair of opposing sidewalls 44 of which have length B and are contiguous with outer sidewalls 24; and a pair of opposing endwalls 42 (of width A) which are contiguous with corresponding endwalls 22 and 32, and which extend between sidewalls 44. Endwalls 42 and sidewalls 44 extend a height $H_3$ from upper intermediate level $L_2$ to perimeter top edge 43 at top level $L_T$. Perimeter top edge 43 defines a top opening 45 through weight 10 can be filled with ballast material. Perimeter top edge 43 is preferably fashioned and adapted to incorporate a drawstring 47 or other suitable means for substantially closing top opening 45 after weight 10 has been filled with ballast material to a desired level, which will typically be around upper intermediate level $L_2$ (but in alternative configurations may be above or below that level). Since upper section 40 in typical applications will not receive a large amount of ballast material (if any), endwalls 42 and sidewalls 44 may if desired be made of a lighter material than other portions of weight 10.

The interior of central section 30 is in fluid communication with the interiors of leg sections 20 across the region above inner sidewalls 23 between lower intermediate level $L_1$ and upper intermediate level $L_2$. As well, the interior of top section 40 is in fluid communication with central section 30 and leg sections 20 across the plane of upper intermediate level $L_2$. Accordingly, when a ballast material is introduced into weight 10 through top opening 45 it can flow into all four sections of weight 10.

Figure 4:
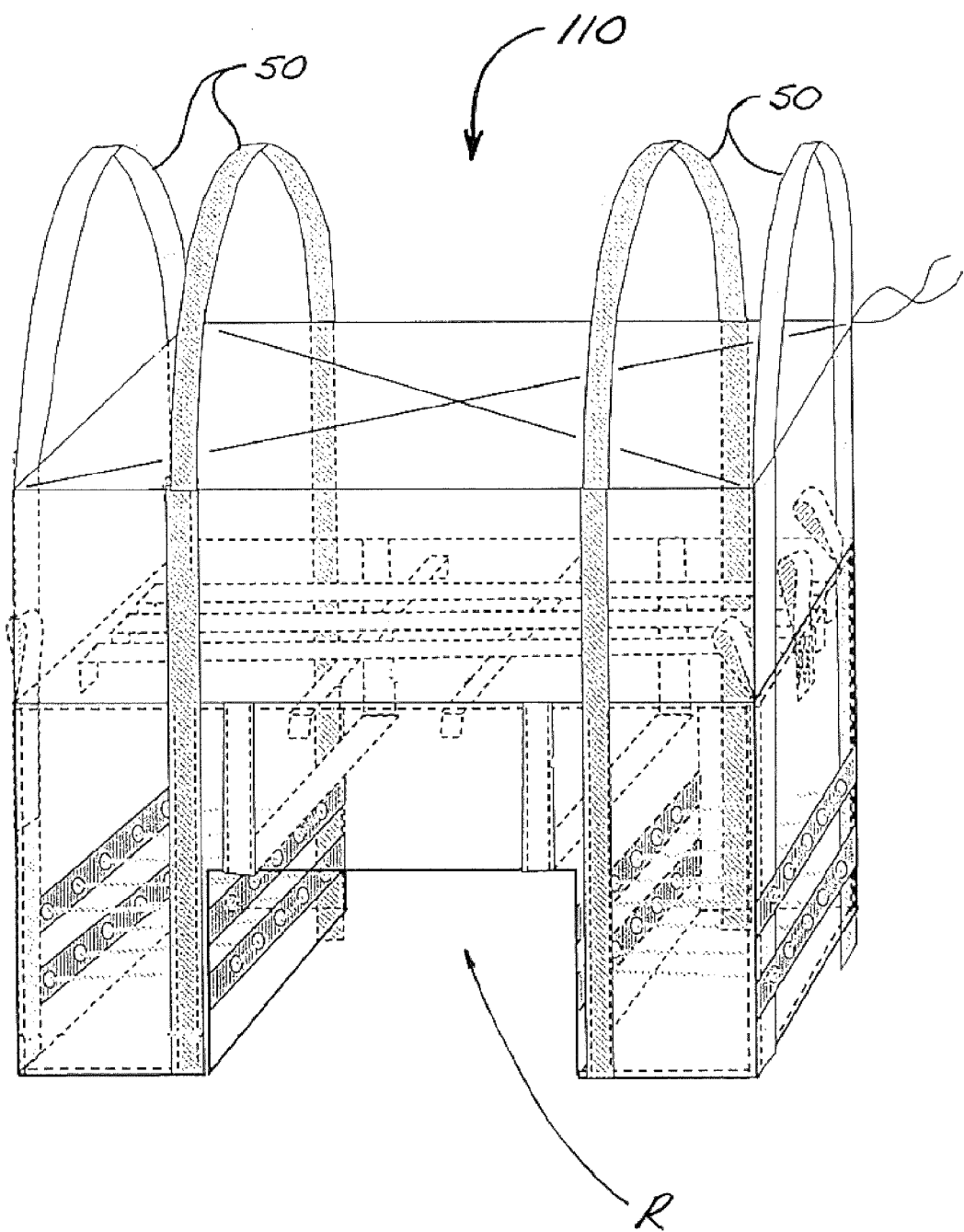
FIG. 4 is a perspective view of a second embodiment of the invention.
Figure 5:
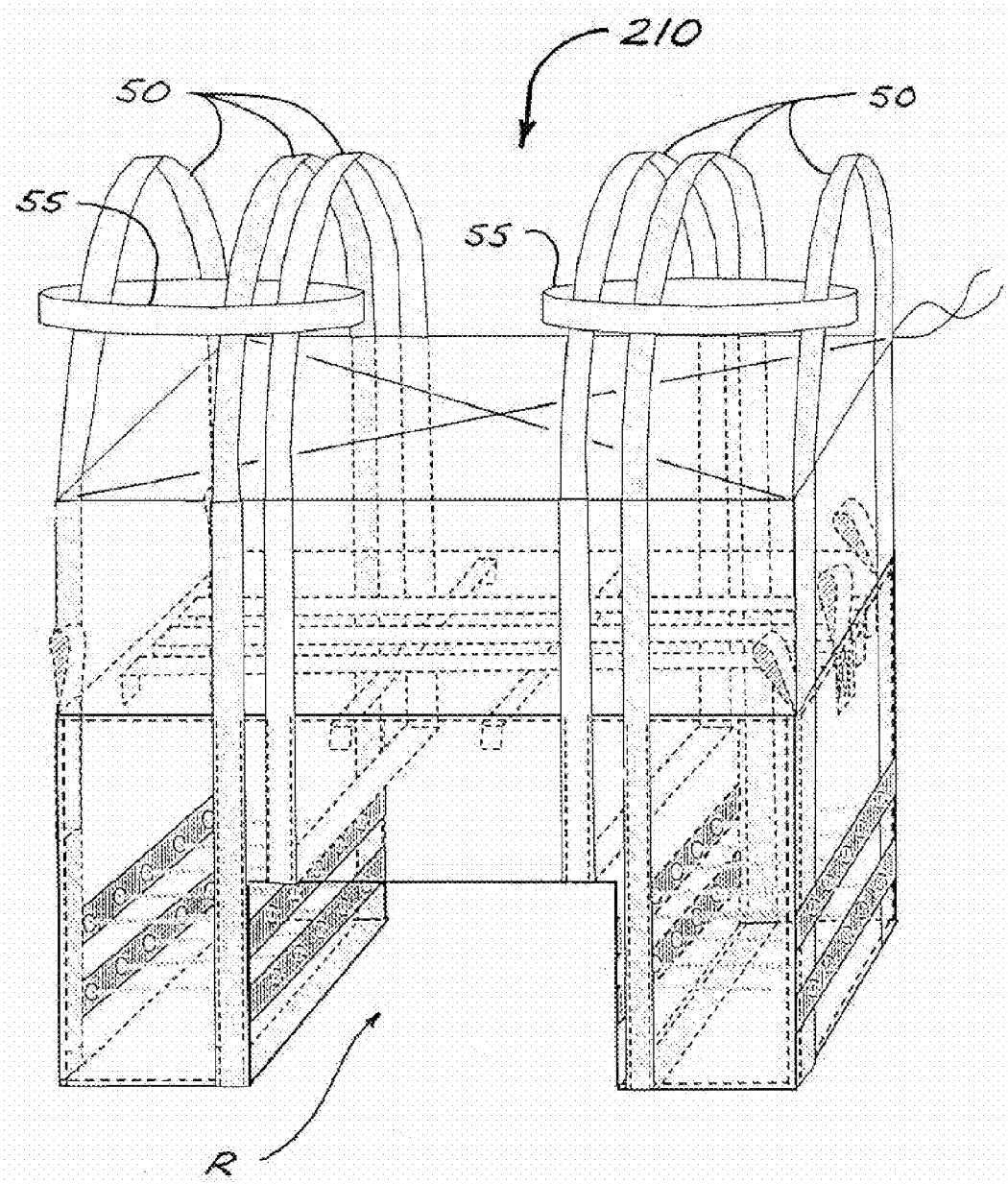
FIG. 5 is a perspective view of a third embodiment of the invention.

In preferred embodiments, when leg sections 20 are charged with ballast, inner sidewalls 23 are maintained at a substantially uniform lateral spacing from their corresponding outer sidewalls 24 by first tie means extending between each inner sidewall 23 and its corresponding outer sidewall 24. In the embodiments shown in FIGS. 3, 4, and 5, the first tie means take the form of a plurality of cables or cords 82 extending between sidewalls 23 and 24 through tie openings 81 in sidewalls 23 and 24. Preferably, sidewalls 23 and 24 incorporate reinforcing bands 80 made of a heavy fabric or other suitable material in the region of tie openings 81, as shown in FIGS. 3, 4, and 5. The first tie means thus have the effect of maintaining sidewalls 23 and 24 generally parallel to each other after being filled with ballast, thus preventing excessive bulging of leg sections 20 and facilitating or enabling installation of weight 10 over a pipeline P in a trench T in situations where the space between pipeline P and the adjacent trench sidewall is as little as width E of leg section 20.

To further prevent or minimize excessive bulging of weight 10 after filling, second tie means in the form of one or more crossties 60 preferably extend between central section endwalls 32 (and/or between leg section endwalls 22, and/or between top section endwalls 42) at or near upper intermediate level $L_2$, as shown in FIGS. 3. 4, and 5. Similarly, third tie means in the form of one or more lateral ties 62 preferably extend between outer sidewalls 24 of leg sections 20 (and/or between top section sidewalls 44) at or near upper intermediate level $L_2$, as shown in FIGS. 3, 4, and 5. As shown in the Figures, crossties 60 and lateral ties 62 preferably form a grid or lattice pattern, with spaces between adjacent crossties 60 and adjacent lateral ties 62, so as to interfere as little as possible with the flow or passage of ballast material into leg sections 20 and central section 30 when weight 10 is being filled. Preferably, crossties 60 and lateral ties 62 are connected (such as by stitching or riveting) where they cross.

Preferred embodiments of pipeline weight 10 incorporate lift means preferably in the form of multiple slings 50 as shown in FIGS. 3, 4, and 5. The locations, lengths, and heights of slings 50, and the materials from which they are fashioned, may be selected and varied to suit specific configurations and installation conditions of weight 10. Typically, slings 50 will be made from a heavy fabric or other strong and flexible material, and securely attached to weight 10 by means of stitching, riveting, or other suitable connection means, optionally in association with reinforcing bands 84 attached to weight 10.

In preferred embodiments, weight 10 has, on each side thereof, a plurality of loading loops 70 securely attached to the inner (or outer) faces of top section sidewalls 44 (or leg section outer sidewalls 24) at or in the general vicinity of upper intermediate level $L_2$. FIGS. 3, 4, and 5 show either two or three loading loops 70 on each side of weight 10, but this is for illustration only; there is no inherent limit to the number of loading loops 70 that may be provided. Loading loops 70 may be used to facilitate the filling of weight 10 with ballast material in a number of alternative ways. In order to use loading loops 70, endwalls 42 and sidewalls 44 of upper section 40 are bunched or folded down as necessary to expose and provide ready access to loading loops 70. The forks of a fork lift (not shown) may then be inserted through loading loops 70, whereupon the fork lift used to lift the empty weight 10 and position it over a pipe stub of a diameter matching that of a pipeline P over which the filled weight 10 is to be installed. The use of a pipe stub facilitates filling of weight 10 for optimal fit over pipeline P.

With empty weight 10 being suspended from the forklift, with floor panels 26 of leg sections 20 being at or near ground level (or other supporting surface), gravel or other ballast material can be introduced into weight 10 using a mobile loader or other suitable materials handling equipment. After weight 10 has been filled to a desired level, weight 10 will be free-standing on filled leg sections 20, such that the forklift forks can be withdrawn from loading loops 70. Endwalls 42 and sidewalls 44 of upper section 40 can then be raised as necessary to allow drawstring 47 to be tightened, thus completely or substantially closing off top opening 45, whereupon suitable hoisting and transport equipment (e.g., wheeled loader, fork lift, or mobile crane) can be used to hoist the loaded weight 10 by means of hoisting slings 50 and to install loaded weight 10 in a desired location over a pipeline P (or to a weight storage area for later installation).

In an alternative loading method, loading loops 70 of an empty pipeline weight 10 are positioned over brackets or lugs of a suitable filling stand or frame instead of the forks of a fork lift. The weight-loading procedure is otherwise generally similar to the procedure using a forklift. After weight 10 has been filled with ballast to the required level, loading loops 70 can be removed from the filling stand so that drawstring 47 can he tightened and loaded weight 10 can be lifted out of the filling stand and moved to the installation area or a storage area.

FIGS. 4 and 5 illustrate only two of many possible hoisting sling arrangements that can be used with pipeline weights in accordance with the present invention. FIG. 4 shows an alternative pipeline weight embodiment 110 that is similar in all respects to weight 10 shown in FIG. 3 except for the location and length of hoisting slings 50. FIG. 5 shows a further embodiment 210 that is similar in all respects to weight 110 shown in FIG. 4 except for the presence of additional hoisting slings 50, and optional sling retainer loop 55 which can be used to gather multiple hoisting slings 50 together and thus facilitate engagement of hoisting slings 50 with crane hooks or other hoisting equipment. The components and construction details of pipeline weights 110 and 210 will be substantially identical to corresponding components and details shown in FIG. 3, so for purposes of simplicity and clarity, reference characters are largely omitted from FIGS. 4 and 5.

It will be readily appreciated by those skilled in the art that various modifications of the present invention may be devised without departing from the essential concept of the invention, and all such modifications are intended to come within the scope of the present invention and the claims appended hereto. It is to be especially understood that the invention is not intended to be limited to illustrated embodiments, and that the substitution of a variant of a claimed element or feature, without any substantial resultant change in the working of the invention; will not constitute a departure from the scope of the invention. For example, although the illustrated embodiments of bag-type pipeline weights are of generally rectilinear configuration in whole or in part, alternative embodiments may incorporate one or more non-rectilinear sections or portions without departing from the fundamental concepts of the invention.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element. Any use of any form of the terms "connect", "attach", or any other term describing an interaction between elements is not meant to limit the interaction to direct interaction between the subject elements, and may also include indirect interaction between the elements such as through secondary or intermediary structure.

The embodiments of the invention in which an exclusive property or privilege is claimed are defined as follows:

1. A pipeline weight made from a flexible material and having a generally arch-like configuration, said pipeline weight comprising:
   (a) a pair of leg sections, each leg section having a floor panel, a pair of opposing endwalls, an inner sidewall extending between said endwalls, and an outer sidewall extending between said endwalls opposite the inner sidewall;
   (b) a central section extending between the inner sidewalls of the leg sections, said central section having opposing endwalls plus a floor panel extending between the endwalls of the central section at a level higher than the floor panels of the leg sections;
   (c) an open-topped top section extending above the leg sections and the central section, said top section having a pair of opposing sidewalls contiguous with the sidewalls of the corresponding leg sections, and a pair of opposing endwalls contiguous with the corresponding endwalls of the leg sections and the central section;
   (d) first tie means extending between the inner and outer sidewalls of each leg section; and
   (e) on each side of the pipeline weight, a plurality of loading loops attached to the inner face of either the corresponding top section sidewall or the corresponding leg section outer sidewall, at or near the juncture between said top section sidewall and leg section outer sidewall;
   wherein:
   (f) the top section is in fluid communication with the leg sections and the central section, such that a flowable ballast material introduced into the top section through its open top will readily flow into the leg sections and the central section; and
   (g) the first tie means is effective to maintain said inner and outer sidewalls of each leg section generally parallel to each other when the leg sections are filled with a flowable ballast material.

2. The pipeline weight of claim 1 wherein the first tie means comprises a plurality of cables or cords.

3. The pipeline weight of claim 1, further comprising second tie means extending between the sidewalls of the top section.

4. The pipeline weight of claim 1, further comprising third tie means extending between the endwalls of the top section.

5. The pipeline weight of claim 1, further comprising hoisting means, for facilitating hoisting and transport of the pipeline weight after being filled with ballast.

6. The pipeline weight of claim 5 wherein the hoisting means comprises a plurality of hoisting slings fastened to and extending above the top section of the pipeline weight.

7. The pipeline weight of claim 1, further comprising closure means, for substantially closing the open top of the top section of the pipeline weight.

8. A pipeline weight made from a flexible material and having a generally arch-like configuration, said pipeline weight comprising:
  (a) a pair of leg sections, each leg section having a floor panel, a pair of opposing endwalls, an inner sidewall extending between said endwalls, and an outer sidewall extending between said endwalls opposite the inner sidewall;
  (b) a central section extending between the inner sidewalls of the leg sections, said central section having opposing endwalls plus a floor panel extending between the endwalls of the central section at a level higher than the floor panels of the leg sections;
  (c) an open-topped top section extending above the leg sections and the central section, said top section having a pair of opposing sidewalls contiguous with the sidewalls of the corresponding leg sections, and a pair of opposing endwalls contiguous with the corresponding endwalls of the leg sections and the central section;
  (d) first tie means extending between the inner and outer sidewalls of each leg section;
  (e) second tie means extending between the top section sidewalls;
  (f) third tie means extending between the top section endwalls;
  (g) on each side of the pipeline weight, a plurality of loading loops attached to the inner face of either the corresponding top section sidewall or the corresponding leg section outer sidewall, at or near the juncture between said top section sidewall and leg section outer sidewall;
  (h) a plurality of hoisting slings; and
  (i) closure means, for substantially closing the open top of said top section;
wherein:
  (j) the top section is in fluid communication with the leg sections and the central section, such that a flowable ballast material introduced into the top section through its open top will readily flow into the leg sections and the central section; and
  (k) the first tie means is effective to maintain said inner and outer sidewalls of each leg section generally parallel to each other when the leg sections are filled with a flowable ballast material.

* * * * *